United States Patent [19]
Egashira et al.

[11] Patent Number: 5,305,114
[45] Date of Patent: Apr. 19, 1994

[54] ELECTRONIC BLACKBOARD APPARATUS

[75] Inventors: Yasuo Egashira, Miyaki; Koji Hisasue; Izumi Fukuda, both of Fukuoka, all of Japan

[73] Assignee: Matsushita Electric Industrial Co., Ltd., Osaka, Japan

[21] Appl. No.: 907,563

[22] Filed: Jul. 2, 1992

[30] Foreign Application Priority Data

| Jul. 12, 1991 | [JP] | Japan | 3-054223[U] |
| Jul. 12, 1991 | [JP] | Japan | 3-054224[U] |
| Jul. 12, 1991 | [JP] | Japan | 3-172360 |
| Sep. 26, 1991 | [JP] | Japan | 3-247566 |

[51] Int. Cl.$^5$ ............... H04N 1/23; B43L 1/08; A47B 97/08; F16M 11/26; F16M 11/38
[52] U.S. Cl. .................. 358/401; 358/498; 358/477; 358/496; 434/411; 434/419; 434/420; 248/460; 248/464; 248/166
[58] Field of Search ........... 358/496, 498, 477, 296, 358/401; 434/408, 420, 411, 412, 413, 414, 415, 419; 248/463, 460, 166, 200.1, 464, 465

[56] References Cited

U.S. PATENT DOCUMENTS

| 4,036,465 | 7/1977 | Kellner | 248/463 |
| 4,744,762 | 5/1988 | Konsuvo | 434/412 |
| 4,856,749 | 8/1989 | Habermann | 248/460 |

*Primary Examiner*—Edward L. Coles, Sr.
*Assistant Examiner*—Scott A. Rogers
*Attorney, Agent, or Firm*—Pollock, Vande Sande & Priddy

[57] ABSTRACT

An electronic blackboard apparatus, which reads a writing on a writing sheet fitted on a blackboard framework and which electronically copies the writing onto a recording medium. The apparatus includes a blackboard framework foldable together with the writing sheet, and a stand supporting the blackboard framework and a copying device. The stand is reducible in size while supporting the blackboard framework and the writing sheet in their folded position and the copying device. The length of the stand is reducible after the blackboard framework and the writing sheet have been folded to reduce their lengths. The blackboard framework and the writing sheet which have been folded are overturned into a space between opposite legs of the stand and the legs are then closed.

27 Claims, 11 Drawing Sheets

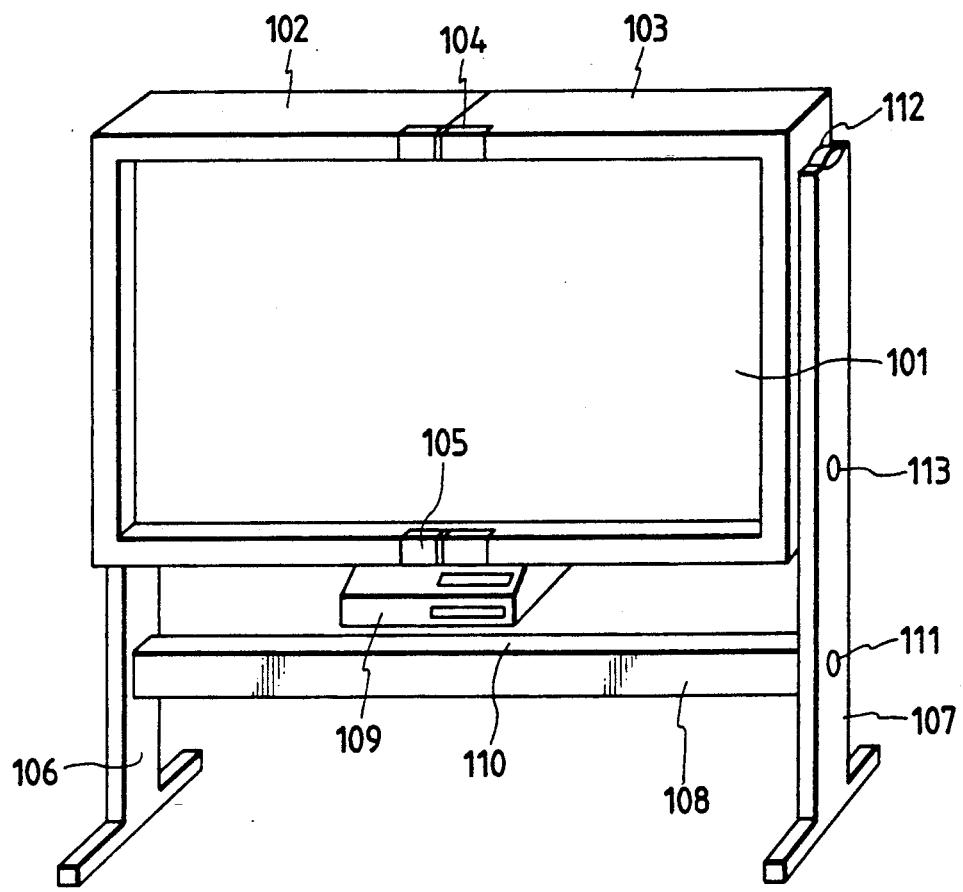

ELECTRONIC BLACKBOARD APPARATUS

BACKGROUND OF THE INVENTION

1. Field of the Invention

The present invention relates to an electronic blackboard apparatus which can copy information such as letters written on a writing sheet fitting on a blackboard framework as on a blackboard or white board onto a recording paper.

2. Description of the Related Art

Recently, an evaluation of operations, such as a production of notes and the minutes in a meeting, of an electronic blackboard apparatus which can copy a writing on a blackboard to a recording paper has been increased.

A prior-art electronic blackboard apparatus will be described with reference to FIG. 20 hereinafter. This apparatus comprises a writing sheet 101, a left-hand blackboard framework half 102, a right-hand blackboard framework half 103, an upper hinge 104, a lower hinge 105, a left-hand stand leg 106, a right-hand stand leg 107, a beam 108 extending between and fastened to the stand legs 106 and 107, by means of screws 111, a printer unit 109, and an operator panel 110.

The blackboard comprising the writing sheet 101, the blackboard framework halves 102 and 103, the hinges 104 and 105 and the printer unit 109 is hung on the tops of the stand legs 106 and 107 by means of opposite pins 112 and fastened to the stand legs 106 and 107 by means of opposite screws 113. The printer unit 109 is attachable to and detachable from the blackboard framework halves 102 and 103. After the printer unit 109 has been detached from the blackboard framework halves 102 and 103, the blackboard framework halves 102 and 103 are foldable over each other on the hinges 104 and 105.

When the electronic blackboard apparatus is transported, the screws 113 fastening the blackboard framework halves 102 and 103 to the stand legs 106 and 107 are removed, the blackboard is then lowered from the legs stand 106 and 107. The printer unit 109 is removed from the blackboard framework halves 102 and 103. The blackboard framework halves 102 and 103 are folded over each other. Removing the screws 111 disassembles the stand to the left-hand stand leg 106, the right-hand stand leg 107 and the beam 108. Thus, the electronic blackboard apparatus is disassembled to several pieces which are packed up if necessary and transported to a destination.

However, a disassembly for transport of the prior-art electronic blackboard apparatus requires a great effort and a reassembly after transport of the electronic blackboard apparatus is also very troublesome. Thus, there is a problem in that the transport of the prior-art electronic blackboard apparatus requires a plurality of workers.

SUMMARY OF THE INVENTION

An object of the present invention is to provide an electronic blackboard apparatus in which the blackboard is foldable and the size of a stand supporting the blackboard and a copying machine is reducible.

A blackboard having a copying means of a first aspect of the present invention comprises a writing sheet, a blackboard framework horizontally extending and holding the writing sheet, the blackboard framework being foldable about essentially the centerline in the length of the writing sheet which has been mounted to the blackboard framework, means for reading a writing on the writing sheet, the reading means constituting part of the copying means, and means for supporting the blackboard framework, a size of the supporting means being reducible in response to a length of the blackboard framework in a folded position.

The present invention requires no troublesome disassembly of the blackboard apparatus, so that one person can compact and then transport the blackboard apparatus.

In the blackboard having the copying means of the first aspect of the present invention, the first portion of the blackboard framework may have a tray receiving a writing implement and the second portion of the blackboard framework which has been folded over the first portion of the blackboard framework closes the tray.

Since the second portion of the blackboard framework closes the tray receiving the marker and the eraser when the blackboard apparatus is compacted, the blackboard apparatus can be compacted and transported while the tray receives the marker and the eraser.

An electronic blackboard apparatus of a second aspect of the present invention comprises a writing sheet, a blackboard framework horizontally extending and holding the writing sheet, the blackboard framework being foldable about essentially the centerline in the length of the writing sheet which has been mounted to the blackboard framework so that a writing surface of the writing sheet is inside the blackboard framework which has been folded, means for reading a writing on the writing sheet, the reading means being mounted to the blackboard framework, and means for supporting the blackboard framework, a size of the supporting means being reducible in response to a length of the blackboard framework in a folded position.

A blackboard apparatus of a third aspect of the present invention comprises a blackboard including a writing sheet and a blackboard framework, the writing sheet constituting a writing surface of the blackboard, the blackboard horizontally extending and being foldable in the length thereof, a hinge enabling the blackboard to be folded in the length of the blackboard, means for copying a writing on the writing sheet onto a recording medium, and means for supporting the blackboard in an upright position. The supporting means extends along the blackboard, the length of the supporting means being reducible in response to the length of the blackboard in a folded position, the blackboard framework comprising first and second portions foldable over each other so that the writing sheet is inside the blackboard framework in a folded position, and the hinge comprising a first pivot provided in the first portion of the blackboard framework and a second pivot provided in the second portion of the blackboard framework, the second pivot being opposed to the first pivot with a spacing therebetween, whereby the hinge assures a roundness of a bent portion of the writing sheet in a folded position. The pivots assure a roundness of a bent portion of the writing sheet in a folded position and produce no crease.

The blackboard apparatus of the third aspect of the present invention may further comprise means for preventing the writing sheet from slipping from the blackboard framework.

Compacting the blackboard apparatus requires no tape nor other means for fastening the writing sheet to the blackboard framework.

BRIEF DESCRIPTION OF THE DRAWINGS

FIG. 20 is a perspective view of a prior-art electronic blackboard apparatus.

DESCRIPTION OF THE PREFERRED EMBODIMENT

A preferred embodiment of the present invention will be described with reference to the drawings hereinafter.

Figure 1:
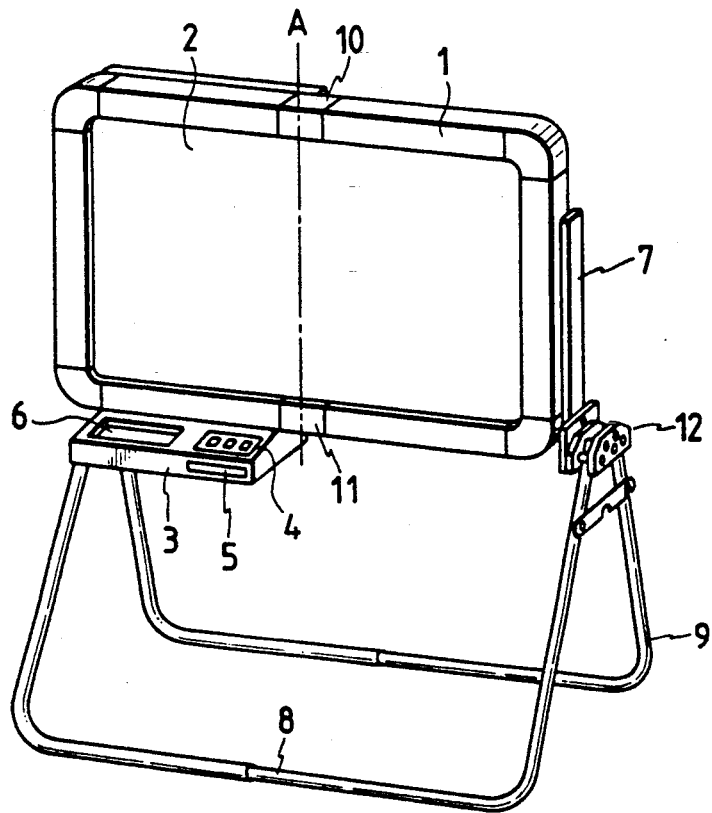
FIG. 1 is a perspective view of an electronic blackboard apparatus according to an embodiment of the present invention.

FIG. 1 shows an electronic blackboard apparatus in service according to an embodiment of the present invention. The electronic blackboard apparatus comprises the blackboard framework 1, a writing sheet 2, a printer unit 3, stand posts 7, a front stand leg 8, a rear stand leg 9, an upper hinge 13, a lower hinge 14, an upper-hinge cover 10, a lower-hinge cover 11, stand fixers 12, an upper stand crossbar 15 and a lower stand crossbar 16.

The printer unit 3 comprises an operator panel 4, a recording paper outlet 5 for discharging a recording paper after printing and a tray 6 formed in a casing of the printer unit 3 and receiving a marker and an eraser.

The printer unit 3 is attached to the underside of a left-hand blackboard framework half 1b.

The stand posts 7 are screwed to the blackboard 1. The stand fixers 12 connect the stand posts 7 to the stand legs 8 and 9. The post crossbars 15 and 16 extend between the stand posts 7.

Figure 2:
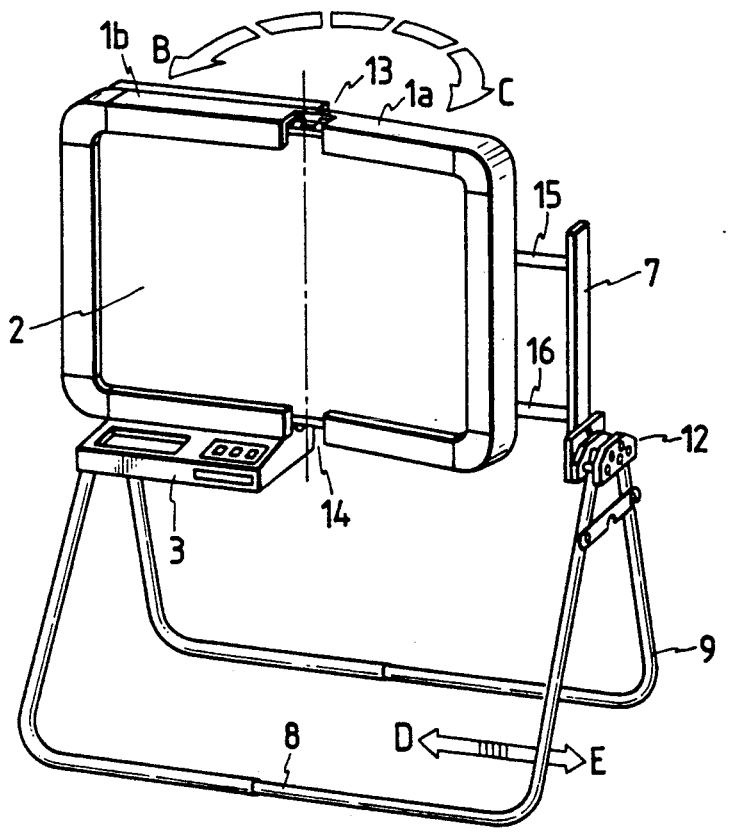
FIG. 2 is a perspective view of the electronic blackboard apparatus of which the blackboard is being folded.

The blackboard framework 1 and the writing sheet 2 are foldable on the hinges 13 and 14 in the directions of arrows B and C, as shown in FIG. 2 after the hinge covers 10 and 11 and the screws for the stand posts 7 have been removed.

Figure 3:
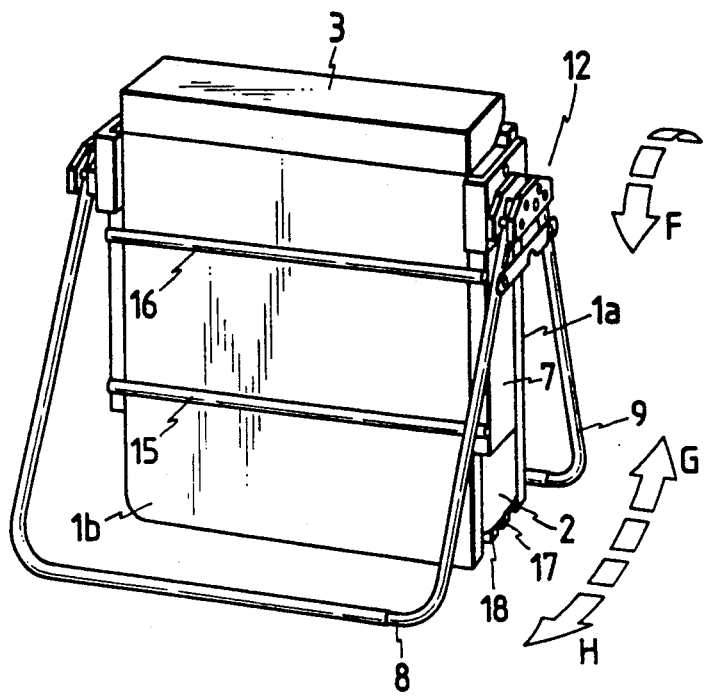
FIG. 3 is a perspective view of the electronic blackboard apparatus of which the blackboard was folded and overturned.
Figure 4:
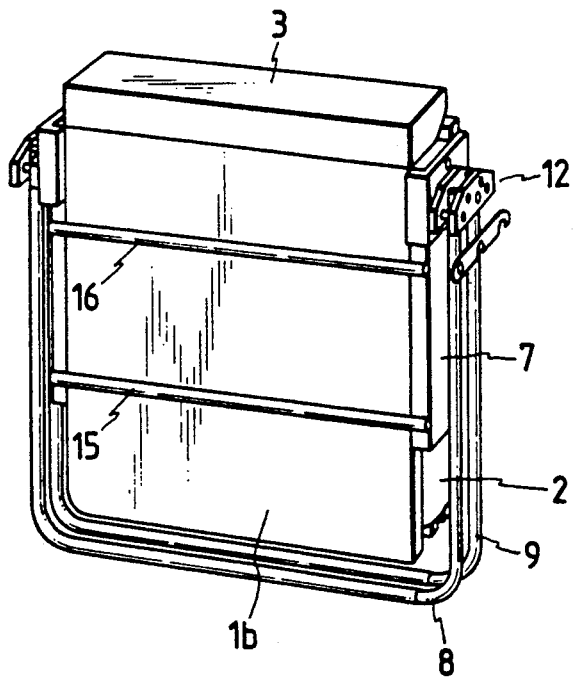
FIG. 4 is a perspective view of the electronic blackboard apparatus of which the blackboard was overturned and of which stand legs were closed.

The stand legs 8 and 9 and the post crossbars 15 and 16 are telescopically extendable and contractible in the directions of arrows D and E, as shown in FIG. 2. As shown in FIG. 3, the blackboard framework 1 which has been folded is overturned about the stand fixers 12 in the direction of an arrow F and the stand legs 8 and 9 are closed in the directions of arrows G and H. Thus, the electronic blackboard apparatus which has been compacted as shown in FIG. 4 can be transported and reserved. In the state that the electronic blackboard apparatus is fully compacted, bottom crossbars of the stand legs 8 and 9 project downwards from the overturned top of the blackboard framework 1 to leave a clearance between the overturned top of the blackboard framework 1 and the bottom crossbars of the stand legs 8 and 9, so that a person can insert his hand into the clearance and grip the bottom crossbars of the stand legs 8 and 9 in order to transport the electronic blackboard apparatus.

Figure 5:
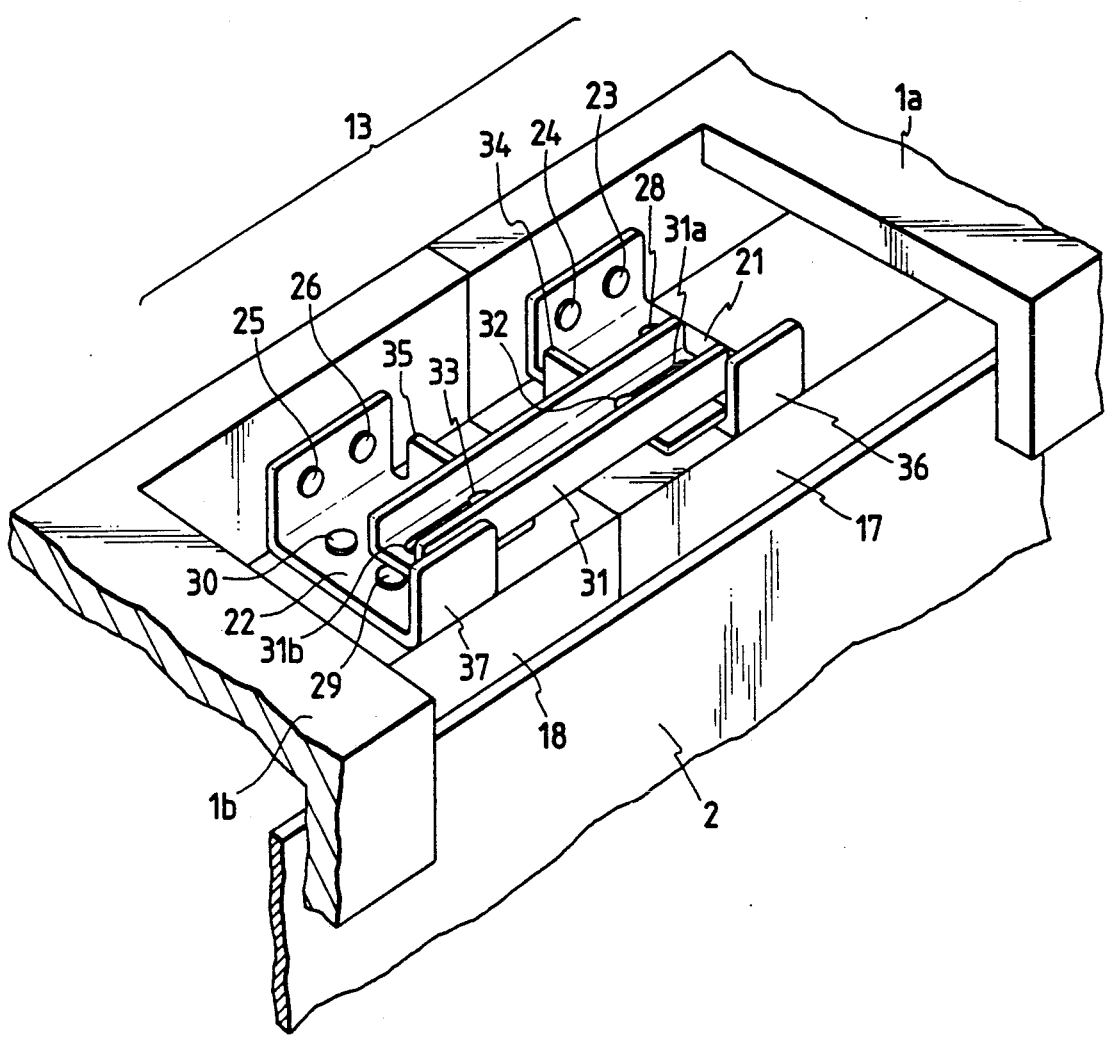
FIG. 5 is an enlarged perspective view of a hinge enabling the blackboard to be folded with the blackboard in an extended position.
Figure 6:
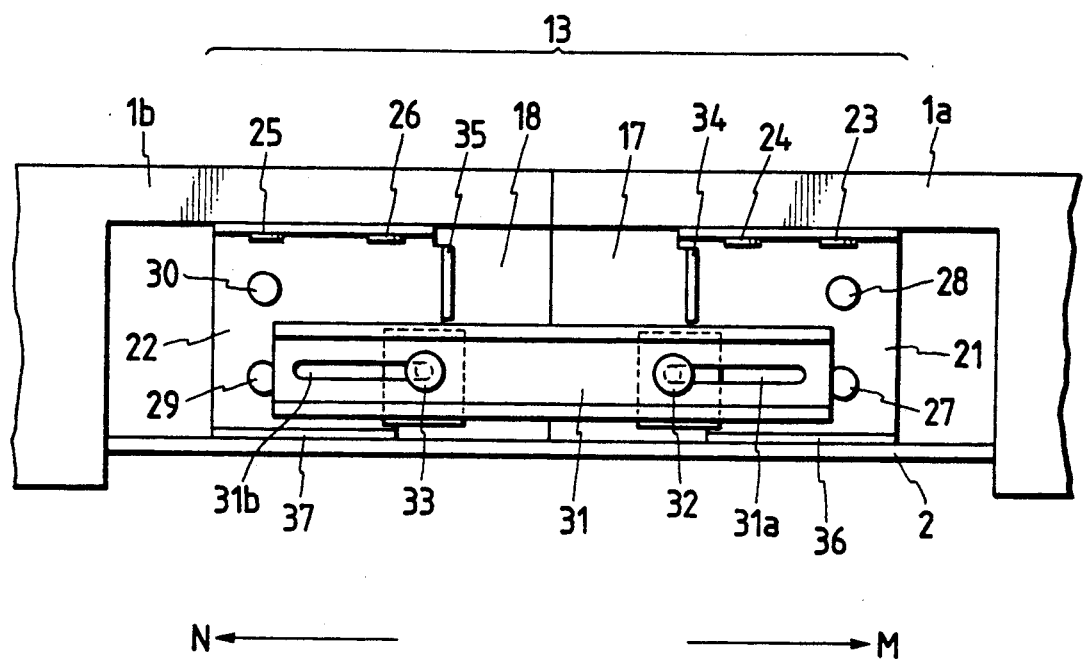
FIG. 6 is a plan view of the hinge of FIG. 5.
Figure 7:
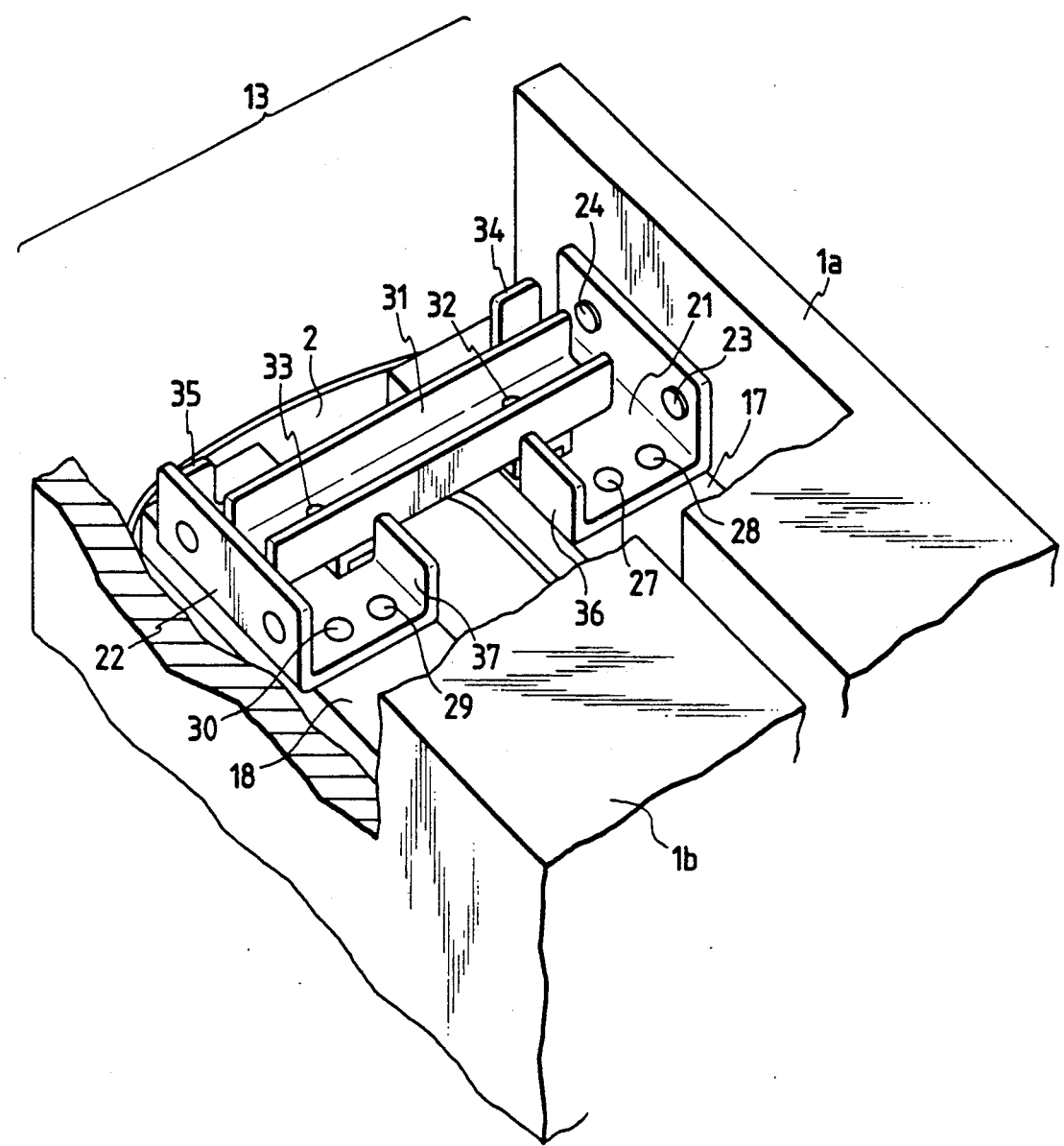
FIG. 7 is an enlarged perspective view of the hinge of FIG. 5 with the blackboard in a closed position.

The structure of each of the hinges 13 and 14 will be described with reference to FIGS. 5–7 hereinafter. FIGS. 5 and 6 are enlarged views of the upper hinge 13 before the blackboard framework 1 is folded. FIG. 7 is an enlarged view of the upper hinge 13 after the blackboard framework 1 has been folded. The hinge 13 comprises hinge hold-down of metal indicated at 21 and 22, a pivot-bridging plate of metal indicated at 31, and pivots indicated at 32 and 33. The hinge 13 is mounted on intermediate panels 17 and 18 of the blackboard framework 1. Since the hinge hold-downs 21 and 22 have the same structure, only the hinge hold-down 21 will be described hereinafter.

The front end of the hinge hold-down 21 has a front upright stop 36. The rear end of the hinge hold-down 21 has a rear upright fastened to the right-hand blackboard framework half 1a. The inner side of the hinge hold-down 21 opposite to the inner side of the hinge hold-down 22 has an inner-side upright stop 34. The hinge hold-down 22 also has a front upright stop 37, a rear upright and an inner-side upright stop 35.

The intermediate panels 17 and 18 which are respectively fastened to a right-hand blackboard framework half 1a and a left-hand blackboard framework half 1b support the writing sheet 2 from the back surface of the writing sheet 2. The hinge hold-down 21 is fastened to the right-hand blackboard framework half 1a by means of screws 23 and 24 and to the intermediate panel 17 by means of screws 27 and 28. The hinge hold-down 22 is also fastened to the left-hand blackboard framework half 1b by means of screws 25 and 26 and to the intermediate panel 18 by means of screws 29 and 30.

The pivot-bridging plate 31 has slots 31a and 31b extending therealong and is rotatably mounted on the hinge hold-downs 21 and 22 through the pivots 32 and 33 passing through the slots 31a and 31b.

The upper and lower hinges 13 and 14 enable the blackboard 1 to be folded on the pivots 32 and 33. As shown in FIG. 6, during folding of the blackboard 1, the respective pivots 32 and 33 move relative to the pivot-bridging plate 31 in the directions of arrows M and N. The pivot-bridging plate 31 keeps the distance between the pivots 32 and 33 to be equal to or larger than the distance between the inner edges of the slots 31a and 31b. The plate 51 also serves as a stop for flanges 36 and 37 of the hinge hold-downs 21 and 22 to limit rotation of the blackboard framework halves 1a and 1b. Thus, a clearance between the intermediate panels 17 and 18, which have been folded over each other, is secured and the roundness of a bent portion of the writing sheet 2 is secured. Thus, a damage or crease in the writing sheet 2 due to the folding of the blackboard framework 1 is precluded.

Figure 8:
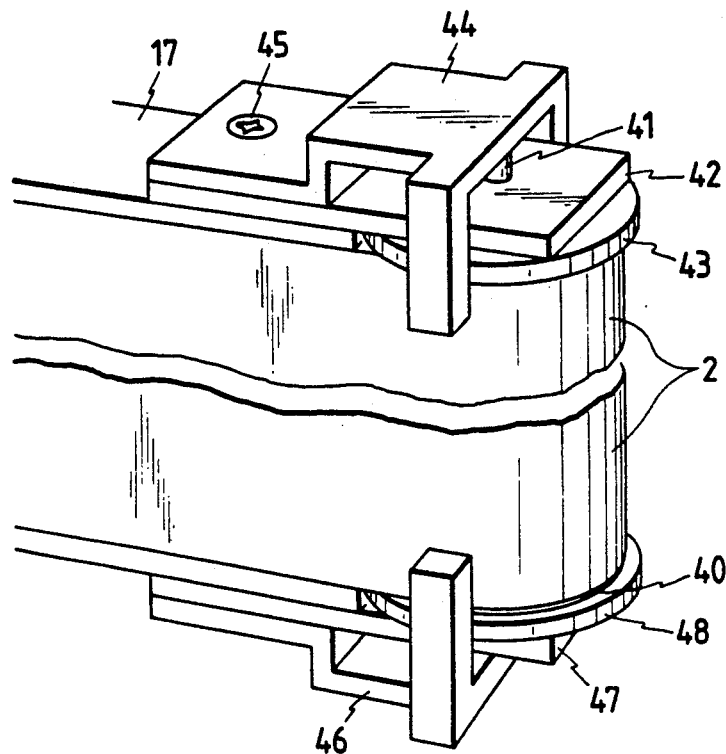
FIG. 8 is a cutaway enlarged perspective view of an arrangement of a sheet feed roller of the electronic blackboard apparatus of FIG. 1.
Figure 9:
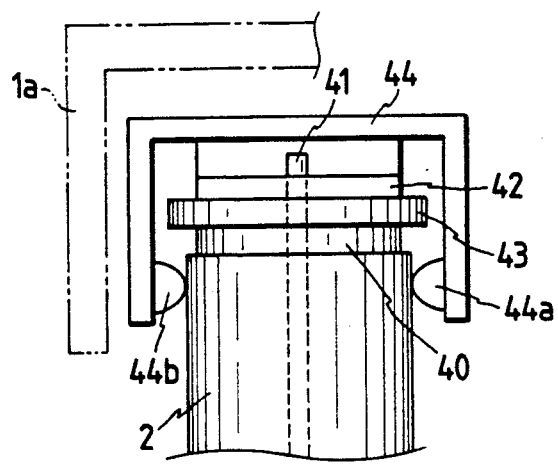
FIG. 9 is a side elevation of the sheet feed roller of FIG. 8.

A structure as shown in FIGS. 8 and 9 prevents the writing sheet 2 from a slackening and a slippage. The slippage guard for the writing sheet 2 will be described hereinafter. FIG. 8 is a perspective view of an internal structure of the right-hand blackboard framework half 1a. FIG. 9 is a side elevation of a sheet feed roller arrangement of the internal structure of the right-hand blackboard framework half 1a.

A sheet feed roller of metal in vertical position is indicated at 40, a rotatable shaft of the sheet feed roller 40 is indicated at 41, upper and lower bearings for the rotatable shaft 41 are indicated at 42 and 47, an upper sheet-retaining yoke is indicated at 44, a lower sheet-retaining yoke is indicated at 46, and upper and lower flanges of the sheet feed roller 40 are indicated at 43 and 48. The upper bearing 42 and the upper sheet-retaining yoke 44 are fastened to the top surface of the intermediate panel 17 by means of a screw 45. The lower bearing 47 and the lower sheet-retaining yoke 46 are also fastened to the underside of the intermediate panel 17 by means of a screw 45.

The flanges 43 and 48 are provided at the upper and lower ends of the sheet feed roller 40. As shown in FIG. 9, the inner surfaces of the two opposite prongs of the upper sheet-retaining yoke 44 have semispherical bosses 44a and 44b in contact with the writing sheet 2. The lower sheet-retaining yoke 46 also has the same semi-spherical bosses as the upper sheet-retaining yoke 44.

During folding of the blackboard framework 1, the upper and lower flanges 43 and 48 prevent the writing sheet 2 from a vertical slippage from the blackboard framework 1 due to a slackening in the writing sheet 2 and on the other hand, the upper and lower sheet-retaining yoke 44 and 46 prevent the writing sheet 2 from an escape due to the slackening in the writing sheet 2 in the direction of a normal to the surface of the writing sheet 2. Since the semispherical bosses 44a and 44b of the upper sheet-retaining yoke 44 and the semispherical bosses of the lower sheet-retaining yoke 44 are in point-contact with the writing sheet 2, the bosses give almost no drag to the writing sheet 2 during normal feed of the writing sheet 2.

The left-hand blackboard framework half 1b has essentially the same internal structure as the right-hand blackboard framework half 1a except that the left-hand blackboard framework half 1b includes a drive motor (not shown) for feeding the writing sheet 2 and a reading head (not shown) reading a writing on the writing sheet 2.

Figure 10:
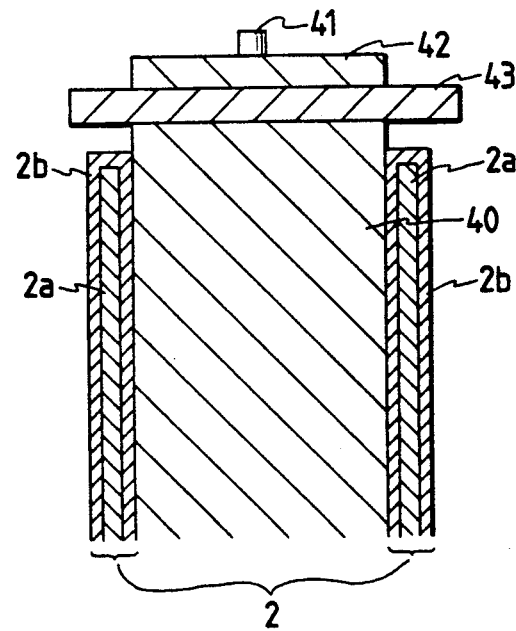
FIG. 10 is a sectional view of the sheet feed roller having a static electricity erasing structure.

As shown in FIG. 10, the writing sheet 2 has an electrically conductive coating 2b over their surfaces of the front and back surfaces and the upper and lower edge surfaces. The coating 2b is made of a coating material including an electrically conductive material, e.g., copper powder, copper-base alloy powder, iron powder or iron-base alloy powder. Thus, even if at least one of the surfaces of the writing sheet 2 is electrically connected to the sheet feed roller 40 and a person wipes the writing on the writing sheet 2 by means of an eraser to electrically charge the writing sheet 2, an electrical charge in the writing sheet 2 is transferred to the blackboard 1 through the sheet feed roller 40, the rotatable shaft 41, the bearing plate 42 and the intermediate panel 17. Provisions of the electrically conductive coating 2b and the sheet feed roller 40 of metal preclude the need for a great change in the structure of the prior-art electronic blackboard apparatus and discharge static electricity out of the writing sheet 2.

In the present embodiment of the invention, the upper edge surface and the lower edge surface of the writing sheet 2 have the electrically conductive coating 2b. However, if the front and back surfaces of the writing sheet 2 are electrically connected to each other, an alternative means may be employed instead of the electrically conductive coating on the upper and lower edge surfaces of the writing sheet 2.

Figure 19:
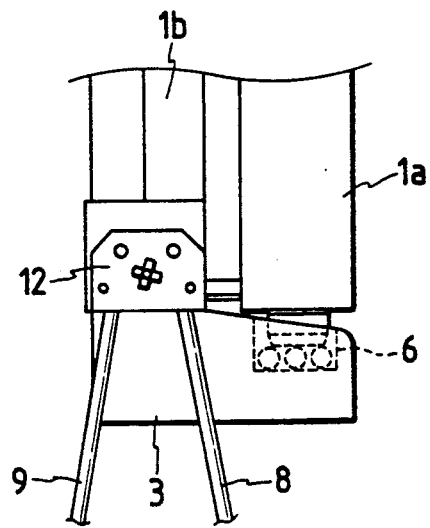
FIG. 19 is a cutaway side elevation of the blackboard in a folded position.

As shown in FIGS. 1 and 2, the printer unit 3 is mounted to the underside of the left-hand blackboard framework half 1b. The printer unit 3 has a length essentially equal to the length of the lower portion of the left-hand blackboard framework half 1b and a depth of a few cm to the front surface of the lower portion of the left-hand blackboard framework half 1b. As shown in FIG. 19, the casing of the printer unit 3 has an upright front surface and an oblique top surface downwards to the upright front surface.

As seen in FIG. 19, the reversed back surface of the right-hand blackboard framework half 1a in a folded position aligns with the front surface of the casing of the printer unit 3 and the underside of the right-hand blackboard framework half 1a in the folded position and the oblique top surface of the printer unit 3 together define a clearance allowing the top surface of the casing of the eraser placed on markers received in the tray 6 to be out of contact with the underside of the right-hand blackboard framework half 1a in the folded position. Thus, the person can transport the electronic blackboard apparatus which has been folded while the tray 6 receives the markers and the eraser.

Figure 11:
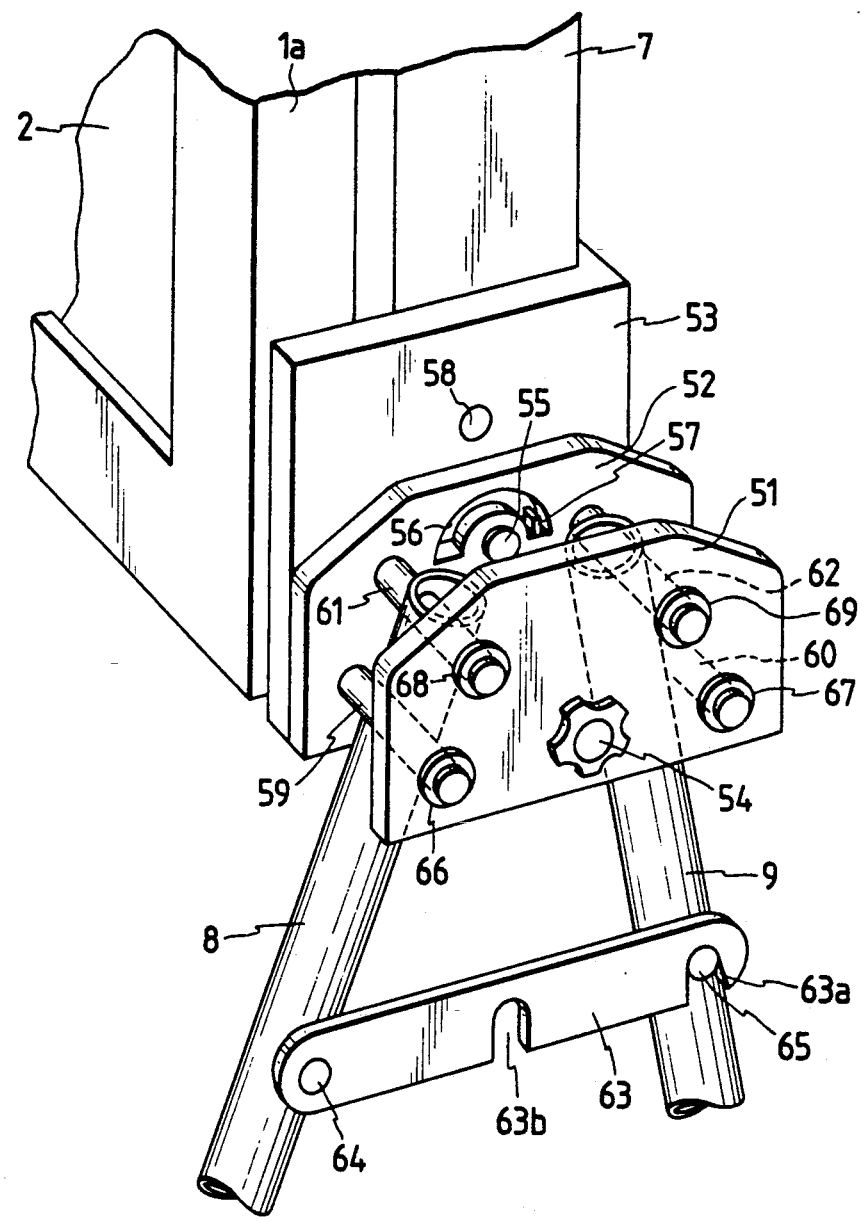
FIG. 11 is an enlarged perspective view of a stand fixer between a stand post and stand legs.
Figure 12:
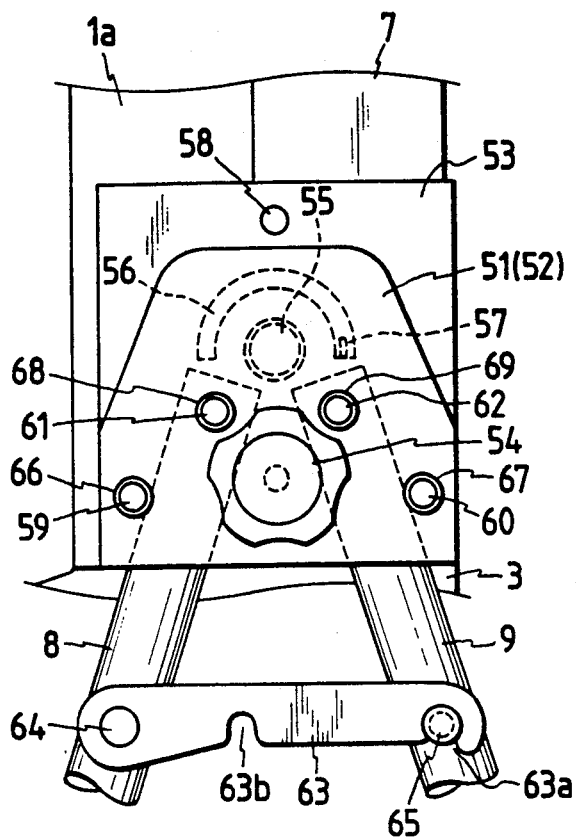
FIG. 12 is a side elevation of the stand fixer of FIG. 11 with the legs in an installed position.
Figure 13:
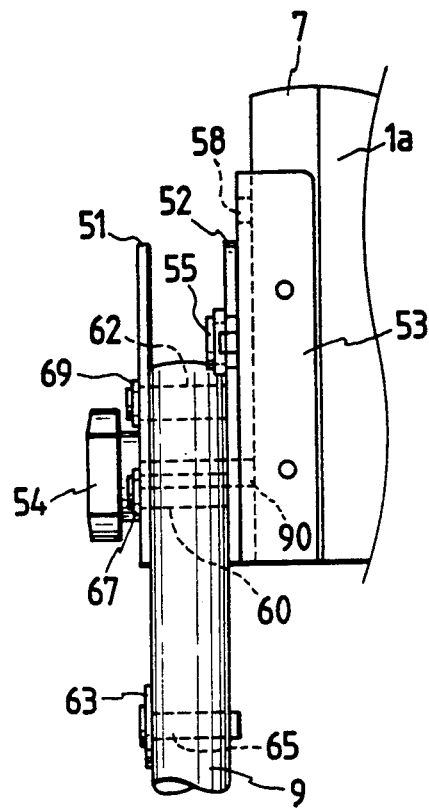
FIG. 13 is a rear elevation of the stand fixer of FIG. 11.

The stand fixer 12 will be described with reference to FIGS. 11-13 hereinafter. FIG. 11 is a perspective view of the stand fixer 12. FIG. 12 is a side elevation of the stand fixer 12. FIG. 13 is a rear elevation of the stand fixer 12. The stand fixer 12 comprises a hexagonal stand-retaining plate 51, a post-mounting plate 52 opposite to the stand-retaining plate 51 and having the same shape as the stand-retaining plate 51, a post-supporting bracket 53, rod-shaped stops 59 and 60 for the stand legs 8 and 9, fixed shafts 61 and 62 about which the stand legs 8 and 9 rotate and which are fastened to the post-mounting plate 52, a knobbed screwed bolt 54, and a fixed shaft 55 for rotating the stand post 7.

The stops 59 and 60 stopping the opening of the stand legs 8 and 9 are fixed to the post-mounting plate 52 and pass through the stand-retaining plate 51. The respective front ends of the rod-shaped stops 59 and 60 have snap rings 66 and 67 mounted thereon. The respective fixed shafts 61 and 62 are fixed to the post-mounting plate 52 and pass through the stand legs 8 and 9 and the stand retaining plate 51. The respective front ends of the fixed shafts 61 and 62 have snap rings 68 and 69 mounted thereon. The shaft 55 for rotating the stand post 7 projects from the post-supporting bracket 53 and connects a first assembly of the stand-retaining plate 51 and the post-mounting plate 52 to a second assembly of the post-supporting bracket 53, the stand post 7 and the right-hand blackboard framework half 1a so that the first and second assemblies can be rotated relative to each other. The post-mounting plate 52 has an arcuate opening 56 about and above the position of the shaft 55 extending through more than 180°. On the other hand, a rotation stop 57 projects from the post-supporting bracket 53 into the arcuate opening 56. As shown in FIG. 11, when the stand post 7 is in a standing position, the rotation stop 57 contacts the rear edge of the arcuate opening 56, so that the blackboard framework 1 cannot be rotated rearwards from the upright position thereof. On the other hand, when the stand post 7 is rotated forward to a fully overturned position through approximately 180°, the rotation stop 57 contacts the front edge of the arcuate opening 56, so that the stand post 7 cannot be rotated rearwards from its full overturned position. Thus, the rotation stop 57 limits the angle of rotation of the stand post 7 to approximately 180°.

The top ends of the stand legs 8 and 9 are rotatably mounted on the shafts 61 and 62. The stop 66 limits a rotation of the stand leg 8 forward from an installed position as shown in FIG. 11. On the other hand, the stop 67 also limits a rotation of the stand leg 9 rearward from an installed position as shown in FIG. 11.

Figure 14:
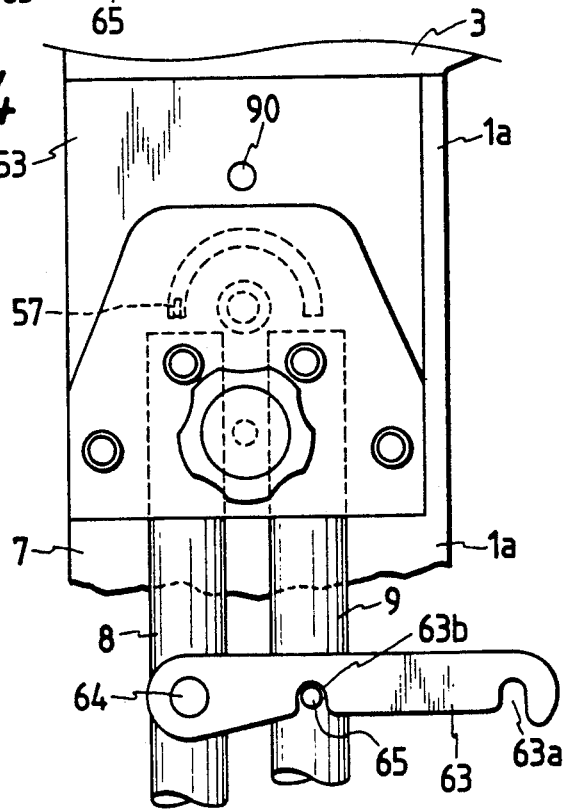
FIG. 14 is a side elevation of the stand fixer of FIG. 11 with the legs in their closed position.

The front stand leg 8 has a leg-positioning bar 63 rotatably mounted thereto by means of a pin 64. The lower edge of an intermediate of the leg-positioning bar 63 defines a notch 63b and the lower edge of the rear end of the leg-positioning bar 63 defines a notch 63a. The rear stand leg 9 has a pin 65 attached thereto opposite to the pin 64 on the front stand leg 8. As seen in FIG. 11, engaging the notch 63a with the pin 65 on the rear stand leg 9 enables the leg-positioning bar 63 to fix the stand legs 8 and 9 in their opened or installed position. On the other hand, engaging the notch 63b with the pin 65 on the rear stand leg 9 enables the leg-positioning bar 63 to fix the stand legs 8 and 9 in their closed position, as seen in FIG. 14.

The knobbed screwed bolt 54 passes through the stand-retaining plate 51 and the post-mounting plate 52 and engages a female screw 90 in the post-supporting bracket 53. Screwing the knobbed screwed bolt 54 tightly into the female screw 90 in the post-supporting bracket 53 prevents the assembly of the stand post 7 and the post-supporting bracket 53 from rotating about the shaft 55 and enables the stand-retaining plate 51 and the post-mounting plate 52 to fixedly clamp the stand legs 8 and 9.

The post-supporting bracket 53 has a female screw 58 corresponding to the female screw 90 at a position symmetrical with that of the female screw 90 with respect to the shaft 55. Thus, when the electronic blackboard apparatus is folded and reduced in size as shown in FIG. 4, the knobbed screwed bolt 54 tightly engages the female screw 58 to fix the stand legs 8 and 9 in their closed position as shown in FIG. 14.

FIGS. 15-18 illustrate a telescopic structure of the crossbars 15 and 16 extending between the stand posts 7 and the bottom crossbars of the stand legs 8 and 9. Since telescopic structures are identical to one another, only the telescopic structure of the stand leg 8 will be described hereinafter.

Figure 15:
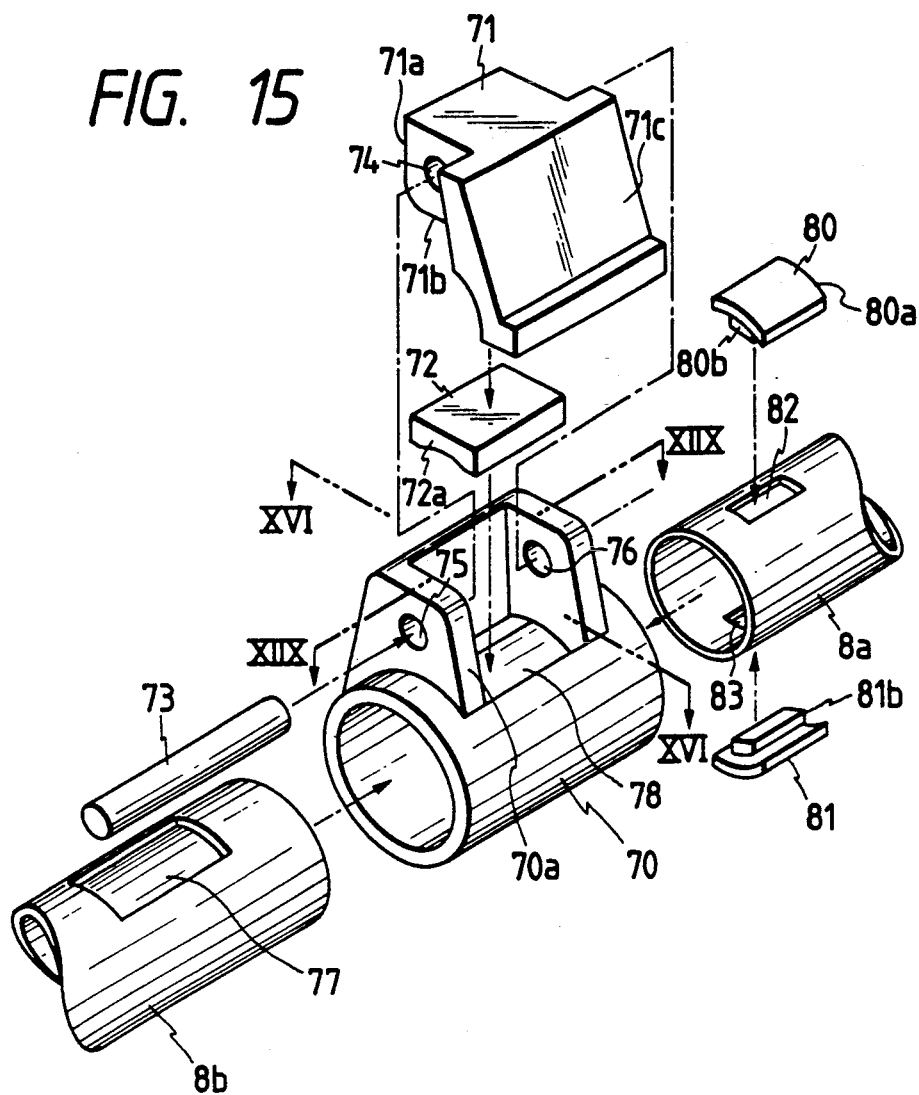
FIG. 15 is an exploded perspective view of a telescopic structure of a crossbar of a stand leg.
Figure 16:
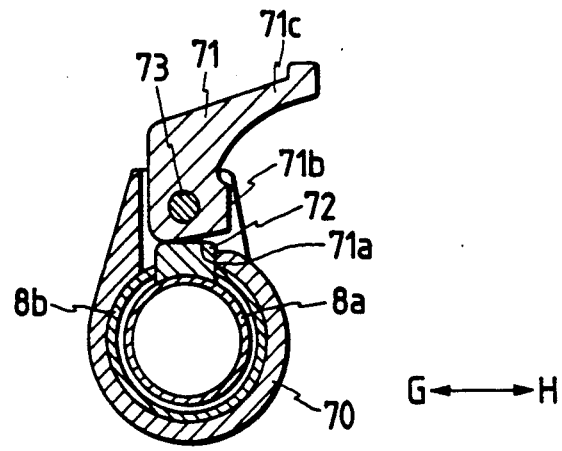
FIG. 16 is a sectional view taken along the line XVI—XVI in FIG. 15 with the telescopic structure in an unlocked position.
Figure 17:
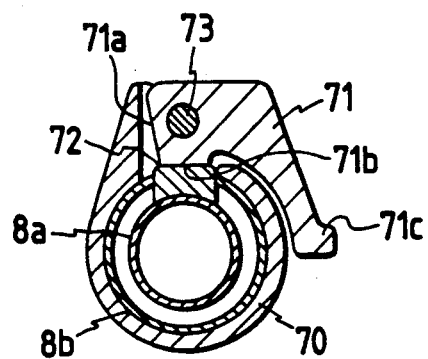
FIG. 17 is the sectional view taken along the line XVI—XVI in FIG. 15 with the telescopic structure in a locked position.
Figure 18:
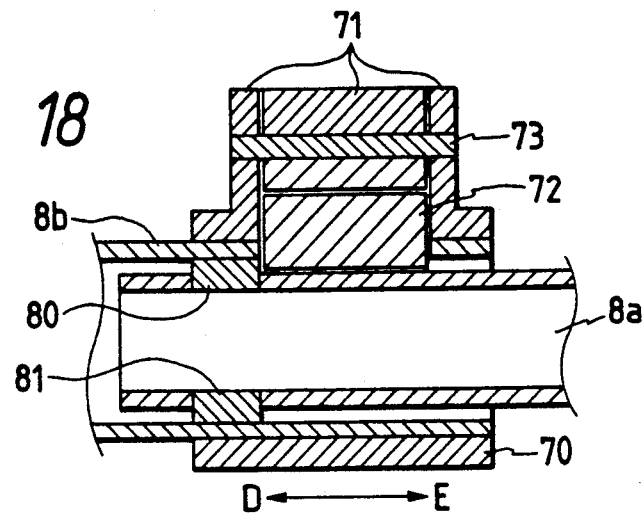
FIG. 18 is a sectional view taken along the line XIIX—XIIX in FIG. 15.

FIG. 15 is an exploded perspective view of the telescopic structure of the stand leg 8. FIG. 16 is a sectional view of the telescopic structure in an unlocked position. FIGS. 17 and 18 are sectional views of the telescopic structure in a locked position. The telescopic structure comprises a right-hand tubular crossbar half 8a of the stand leg 8, a left-hand tubular crossbar half 8b of the stand leg 8, a tubular housing 70, a lock lever 71, a locking block 72, a pivot 73 for the lock lever 71, and crossbar sliders 80 and 81.

A top part of an end of the right-hand crossbar half 8a defines a rectangular hole 82 fitting the body 80b of an upper crossbar slider 80. A bottom part of the end of the right-hand crossbar half 8a defines a rectangular hole 83 fitting the body 81b of a lower crossbar slider 81. A top part of an end of the left-hand crossbar half 8b defines a rectangular hole 77 fitting the locking block 72.

A top part of the housing 70 has an upright pivot bearing 70a having opposite openings 75 and 76. The top part of the housing 70 also defines a rectangular hole 78 corresponding to the rectangular hole 77 within the pivot bearing 70a. The housing 70 receives both the right-hand crossbar half 8a and the left-hand crossbar half 8b so that the end of the left-hand crossbar half 8b receives the end of the right-hand crossbar half 8a.

The lock lever 71 is rotatably mounted on the pivot 73. An opening 74 in the block-shaped body of the lock lever 71 fits the pivot 73. The body of the lock lever 71 is rotatably mounted within the pivot bearing 70a. The underside of the locking block 72 has a curved surface fitting the outer cylindrical surface of the right-hand crossbar half 8a. The locking block 72 fits together the rectangular hole 78 in the housing 70 and the rectangular hole 77 in the left-hand crossbar half 8b and sits on the top part of the end of the right-hand crossbar half 8a.

As shown in FIG. 18, when the end of the right-hand crossbar half 8a is positioned within the housing 70 in the most extended position of the bottom crossbar of the stand leg 8, the right-hand edge surface 80a of the upper crossbar slider 80 engages the left-hand edge surface 72a of the locking block 72 so that the right-hand crossbar half 8a can be freely moved leftward (i.e., the bottom crossbar of the stand leg 8 can be contracted) but cannot be removed rightward from the housing 70. On the other hand, an engagement of the locking block 72 with the edge of the rectangular hole 77 in the left-hand crossbar half 8b fixes the left-hand crossbar half 8b to the housing 70.

As shown in FIG. 16, when the telescopic structure is in an unlocked position, the handle 71c of the lock lever 71 is in an upper position and an unlocking surface 71a of the lock lever 71 is in a loose contact with the top surface of the locking block 72 so that the right-hand crossbar half 8a can be freely moved leftward or rightward. As shown in FIG. 17, when the telescopic structure is in a locked position, the handle 71c of the lock lever 71, which has been lowered lower than a position in which the handle 71c of the lock lever 71 lies, is in a lower position and a locking surface 71b of the lock lever 71 is in a tight contact with the top surface of the locking block 72 so that the right-hand crossbar half 8a is locked.

What is claimed is:
1. A blackboard having a copying means, comprising:
a blackboard framework horizontally extending and having a writing surface on which a writing sheet is to be mounted;

means for enabling said blackboard framework to be folded about essentially the centerline in the length of the writing surface so that the writing sheet is inside said blackboard framework in a folded position;

means for reading a writing on said writing sheet, said reading means constituting part of the copying means; and means for supporting said blackboard framework, a size of said supporting means being reducible in response to a length of said blackboard framework in a folded position, said supporting means including a leg capable of standing on a support floor, the leg including opposite standing portions and a crossbar assembly extending between the opposite standing portions of the leg, the crossbar assembly being movable lengthwise of said blackboard framework to be extended and contracted.

2. The blackboard having the copying means as recited in claim 1, wherein said blackboard framework comprises first and second portions divided along the length of said blackboard framework.

3. A blackboard having a copying means, comprising:
a writing sheet;
a blackboard framework horizontally extendable and holding said writing sheet, said blackboard framework comprising first and second portions divided along the length of said blackboard framework, said blackboard framework being foldable about essentially the centerline of said writing sheet which has been mounted to said blackboard framework;

means for reading a writing on said writing sheet, said reading means constituting part of the copying means;

means, reducible in size, for supporting said blackboard framework, said supporting means comprising a first pipe extending along the length of said blackboard framework, and a second pipe aligning with the first pipe and having a smaller outer diameter than the inner diameter of the first pipe, the first pipe receiving the second pipe, said supporting means comprising a leg capable of standing on a support floor and means for overturning said blackboard in the folded position, the leg including opposite standing portions and a crossbar extending between the bottom ends of the opposite standing portions of the leg, the overturning means enabling said blackboard, in the folded position, to be overturned about an axis extending between the top ends of the opposite portions of the leg while said supporting means supports said blackboard, said blackboard having a width leaving a clearance for griping the crossbar of the leg between the overturned top edge of said blackboard and the crossbar of the leg.

4. A blackboard having a copying means, comprising:
a writing sheet;
a blackboard framework horizontally extending and holding said writing sheet, said blackboard framework comprising first and second portions divided along the length of said blackboard framework, said blackboard framework being foldable about essentially the centerline of said writing sheet which has been mounted to said blackboard framework;

means for reading a writing on said writing sheet, said reading means constituting part of the copying means;

means, reducible in size, for supporting said blackboard framework, wherein the first portion of said blackboard framework has a tray receiving a writing implement and the second portion of said blackboard framework, which has been folded over the first portion of said blackboard framework, closes the tray.

5. An electronic blackboard apparatus, comprising:
a writing sheet;
a blackboard framework horizontally extending and holding said writing sheet, said blackboard framework being foldable about essentially the centerline of said writing sheet which has been mounted to said blackboard framework so that a writing surface of said writing sheet is inside said folded blackboard framework;

means for reading a writing on said writing sheet, said reading means being mounted to said blackboard framework; and means for supporting said blackboard framework, the size of said supporting means being reducible in response to folded length reduction of said blackboard framework, said supporting means including a leg capable of standing on a support floor, the leg including opposite standing portions and a telescoping crossbar assembly extending between the opposite standing portions of the leg, the crossbar assembly being movable lengthwise of said blackboard framework.

6. The electronic blackboard apparatus as recited in claim 5, wherein said blackboard framework comprises first and second portions divided along the length of said blackboard framework.

7. An electronic blackboard apparatus, comprising:
a blackboard framework horizontally extending and having a writing surface on which a writing sheet is to be mounted;

means for enabling said blackboard framework to be folded about essentially the centerline in the length of the writing surface so that the writing sheet is inside said blackboard framework in a folded position;

means for reading a writing on said writing sheet, said reading means constituting part of the copying means;

means for supporting said blackboard framework, the size of said supporting means being reducible in response to a length of said blackboard framework in a folded position; and wherein said supporting means comprises a first pipe extending along the length of said blackboard framework, and a second pipe aligning with the first pipe and having a smaller outer diameter than the inner diameter of the first pipe, the first pipe receiving the second pipe.

8. An electronic blackboard apparatus, comprising: a writing sheet;
a blackboard framework horizontally extending and holding said writing sheet, said blackboard framework being foldable about essentially the centerline of said writing sheet which has been mounted to said blackboard framework so that a writing surface of said writing sheet is inside said folded blackboard framework;

means for reading a writing on said writing sheet, said reading means being mounted to said blackboard framework;

means for supporting said blackboard framework, the size of said supporting means being reducible in response to folded length reduction of said blackboard framework, said supporting means including a leg capable of standing on a support floor; and wherein a first portion of said blackboard framework has a first pivot, and a second portion of said blackboard framework has a second pivot parallel to the first pivot, and said blackboard framework has a connection connecting the pivots, the connection enabling the first and second portions of said blackboard framework to be folded over each other.

9. A blackboard having a copying means, comprising:
a blackboard framework horizontally extending and having a writing surface on which a writing sheet is to be mounted;

means for reading a writing on the writing sheet, said reading means being mounted to either one of the first and second portions of said blackboard framework and constituting part of the copying means;

a hinge enabling the first and second portions of said blackboard framework to be folded over each other so that the writing sheet is inside said blackboard framework in a folded position; and means for supporting said blackboard framework, a size of said supporting means being reducible in response to a length of said blackboard framework in a folded position, said supporting means including a leg capable of standing on a support floor, the leg including opposite standing portions and a crossbar assembly extending between the opposite standing portions of the leg, the crossbar assembly being movable lengthwise of said blackboard framework to be extended and contracted.

10. A blackboard having a copying means, comprising:
a blackboard framework horizontally extending and having a writing surface on which a writing sheet is to be mounted;

means for reading a writing on the writing sheet, said reading means being mounted to either one of the first and second portions of said blackboard framework and constituting part of the copying means;

a hinge enabling the first and second portions of said blackboard framework to be folded over each other so that the writing sheet is inside said blackboard framework in a folded position;

means for supporting said blackboard framework, a size of said supporting means being reducible in response to a length of said blackboard framework in a folded position; and wherein said supporting means comprises a first pipe extending along the length of said blackboard framework, and a second pipe aligning with the first pipe and having a smaller outer diameter than the inner diameter of the first pipe, the first pipe receiving the second pipe.

11. A blackboard having a copying means, comprising:
a writing sheet;
a blackboard framework horizontally extending and holding said writing sheet, said blackboard framework being divided into first and second portions along essentially the centerline of said writing sheet which has been mounted to said blackboard framework;

means for reading a writing on said writing sheet, said reading means being mounted to either the first or second portion of said blackboard framework and constituting part of the copying means;

a hinge enabling the first and second portions of said blackboard framework to be folded over each other;

means for supporting said blackboard framework, the size of said supporting means being reducible in response to folded length reduction of said blackboard framework, said supporting means comprising a first pipe extending along the length of said blackboard framework, and a second pipe aligning with the first pipe and having a smaller outer diameter than the inner diameter of the first pipe, the first pipe receiving the second pipe; and wherein the first portion of said blackboard framework has a tray receiving a writing implement and the second portion of said blackboard framework, which has been folded over the first portion of said blackboard framework, closes the tray.

12. The blackboard having the copying means as recited in claim 10, wherein said supporting means comprises means for fixing a positional relationship between the first and second pipes.

13. A blackboard having a copying means, comprising:
a writing sheet;
a blackboard framework horizontally extending and holding said writing sheet, said blackboard framework being divided into first and second portions along essentially the centerline of said writing sheet which has been mounted to said blackboard framework, the first portion of said blackboard framework having a first pivot, the second portion of said framework having a second pivot parallel to the first pivot;

means for reading a writing on said writing sheet, said reading means being mounted to either the first or second portions of said blackboard framework and constituting part of the copying means;

a connection connecting the first and second pivots so as to connect the first and second portions of said blackboard framework and enabling the first and second portions of said blackboard framework to be folded over each other; and means for supporting said blackboard framework, the size of said supporting means being reducible in response to a folded length reduction of said blackboard framework.

14. The blackboard having the copying means as recited in claim 13, wherein said supporting means comprises a first pipe extending along the length of said blackboard framework, and a second pipe aligning with the first pipe and having a smaller outer diameter than the inner diameter of the first pipe, the first pipe receiving the second pipe.

15. The blackboard having the copying means as recited in claim 13, wherein the first portion of said blackboard framework has a tray receiving a writing implement and the second portion of said blackboard framework, which has been folded over the first portion of said blackboard framework, closes the tray.

16. A blackboard apparatus, comprising:
a blackboard including a writing sheet and a blackboard framework, the writing sheet constituting a writing surface of said blackboard, said blackboard horizontally extending and being foldable in the length thereof;

a hinge enabling the blackboard to be folded in the length of said blackboard so that the writing sheet is inside said blackboard framework in a folded position;

means for copying a writing on the writing sheet onto a recording medium; and means for supporting said blackboard in an upright position, said supporting means extending along the blackboard, the length of said supporting means being reducible in response to the length of said blackboard in a folded position, said supporting means comprising a first pipe extending along the length of said blackboard framework, and a second pipe aligning with the first pipe and having a smaller outer diameter than the inner diameter of the first pipe, the first pipe receiving the second pipe.

17. The blackboard having the copying means as recited in claim 16, wherein said supporting means comprises means for fixing a positional relationship between the first and second pipes.

18. The blackboard apparatus as recited in claim 16, wherein said blackboard framework includes a sheet retaining yoke for preventing the writing sheet from slipping from the blackboard framework, the sheet-retaining yoke having two opposite arms in contact with a writing surface of the writing sheet which has been mounted on said blackboard framework.

19. A blackboard apparatus, comprising:
a blackboard including a writing sheet and a blackboard framework, the writing sheet constituting a writing surface of said blackboard, said blackboard horizontally extending and being foldable along the length thereof;

a hinge enabling the blackboard to be folded along the length of said blackboard;

means for copying a writing, present on the writing sheet, onto a recording medium; and means for supporting said blackboard in an upright position, said supporting means extending along the blackboard, the length of said supporting means being reducible in response to folded length reduction of said blackboard; and wherein the blackboard framework comprises first and second portions foldable over each other so that the writing sheet is inside the blackboard framework in a folded position, and said hinge comprises a first pivot provided in the first portion of the blackboard framework and a second pivot provided in the second portion of the blackboard framework, the second pivot being opposed to the first pivot with a spacing therebetween, wherein said hinge assures a roundness of a bent portion of the writing sheet in a folded position.

20. The blackboard apparatus as recited in claim 19, further comprising:
means for preventing the writing sheet from slipping from the blackboard framework.

21. A blackboard apparatus, comprising:
a blackboard including a writing sheet and a blackboard framework, the writing sheet constituting a writing surface of said blackboard, said blackboard framework being horizontally extendable and foldable along the length thereof;

a hinge enabling the blackboard to be folded along the length of said blackboard;

means for copying a writing, present on the writing sheet, onto a recording medium;

means for supporting said blackboard in an upright position, said supporting means being extendable along the blackboard, the length of said supporting means being reducible in response to folded length reduction of said blackboard; and wherein said supporting means comprises a leg capable of standing on a support floor and means for overturning said blackboard in the folded position, the leg including opposite standing portions and a crossbar extending between the bottom ends of the opposite standing portions of the leg, the overturning means enabling said blackboard, in the folded position, to be overturned about an axis extending between the top ends of the opposite portions of the leg while said supporting means supports said blackboard, said blackboard having a width leaving a clearance for griping the crossbar of the leg between the overturned top edge of said blackboard and the crossbar of the leg.

22. A blackboard having a copying means, comprising:
a writing sheet;
a blackboard framework horizontally extending and holding said writing sheet, said blackboard framework being foldable about essentially the centerline of said writing sheet which has been mounted to said blackboard framework, said blackboard framework comprising first and second portions divided along the length of said blackboard framework;

means for reading a writing on said writing sheet, said reading means constituting part of the copying means;

means, reducible in size, for supporting said blackboard framework, said supporting means including a leg capable of standing on a support floor, the leg including opposite standing portions and a crossbar assembly extending between the opposite standing portions of the leg, the crossbar assembly being telescoping; and wherein the first portion of said blackboard framework has a tray receiving a writing implement and the second portion of said blackboard framework, which has been folded over the first portion of said blackboard framework, closes the tray.

23. An electronic blackboard apparatus, comprising:
a writing sheet;
a blackboard framework horizontally extending and holding said writing sheet, said blackboard framework being foldable about essentially the centerline of said writing sheet which has been mounted to said blackboard framework so that a writing surface of said writing sheet is inside said folded blackboard framework;

means for reading a writing on said writing sheet, said reading means being mounted to said blackboard framework; and means for supporting said blackboard framework, the size of said supporting means being reducible in response to folded length reduction of said blackboard framework, said supporting means including a leg capable of standing on a support floor, the leg including opposite standing portions and a crossbar assembly extending between the opposite standing portions of the leg, the crossbar assembly being movable lengthwise of said blackboard framework; and wherein the first portion of said blackboard framework has a first pivot, and the second portion of said blackboard framework has a second pivot parallel to the first pivot, and said blackboard framework has a connection connecting the pivots, the connection enabling the first and second portions of said blackboard framework to be folded over each other.

24. A blackboard having a copying means, comprising:

a writing sheet;

a blackboard framework horizontally extending and holding said writing sheet, said blackboard framework being divided into first and second portions along essentially the centerline of said writing sheet which has been mounted to said blackboard framework;

means for reading a writing on said writing sheet, said reading means being mounted to either the first or second portion of said blackboard framework and constituting part of the copying means;

a hinge enabling the first and second portions of said blackboard framework to be folded over each other; and means for supporting said blackboard framework, the size of said supporting means being reducible in response to folded length reduction of said blackboard framework, said supporting means including a leg capable of standing on a support floor, the leg including opposite standing portions and a telescoping crossbar assembly extending between the opposite standing portions of the leg, the crossbar assembly being movable lengthwise of said blackboard framework; and wherein the first portion of said blackboard framework has a tray receiving a writing implement and the second portion of said blackboard framework, which has been folded over the first portion of said blackboard framework, closes the tray.

25. A blackboard apparatus, comprising:

a blackboard including a writing sheet and a blackboard framework, the writing sheet constituting a writing surface of said blackboard, said blackboard horizontally extending and being foldable along the length thereof;

a hinge enabling the blackboard to be folded along the length of said blackboard;

means for copying a writing, present on the writing sheet, onto a recording medium; and means for supporting said blackboard in an upright position, said supporting means extending along the blackboard, the length of said supporting means being reducible in response to folded length reduction of said blackboard, said supporting means comprising a first pipe extending along the length of said blackboard framework, and a second pipe aligning with the first pipe and having a smaller outer diameter than the inner diameter of the first pipe, the first pipe receiving the second pipe; and wherein the blackboard framework comprises first and second portions foldable over each other so that the writing sheet is inside the blackboard framework in a folded position, and said hinge comprises a first pivot provided in the first portion of the blackboard framework and a second pivot provided in the second portion of the blackboard framework, the second pivot being opposed to the first pivot with a spacing therebetween, whereby said hinge assures a roundness of a bent portion of the writing sheet in a folded position.

26. A blackboard apparatus, comprising:

a blackboard including a writing sheet and a blackboard framework, the writing sheet constituting a writing surface of said blackboard, said blackboard horizontally extending and being foldable along the length thereof;

a hinge enabling the blackboard to be folded along the length of said blackboard;

means for copying a writing, present on the writing sheet, onto a recording medium; and means for supporting said blackboard in an upright position, said supporting means extending along the blackboard, the length of said supporting means being reducible in response to folded length reduction of said blackboard, said supporting means comprising a first pipe extending along the length of said blackboard framework, and a second pipe aligning with the first pipe and having a smaller outer diameter than the inner diameter of the first pipe, the first pipe receiving the second pipe; and wherein said supporting means comprises a leg standing on a floor and means for overturning said blackboard in the folded position, the leg including opposite standing portions and a crossbar extending between the bottom ends of the opposite standing portions of the leg, the overturning means enabling said blackboard in the folded position to be overturned about an axis extending between the top ends of the opposite portions of the leg while said supporting means supports said blackboard, said blackboard having a width leaving a clearance for griping the crossbar of the leg between the overturned top edge of said blackboard and the crossbar of the leg.

27. A blackboard apparatus, comprising:

a blackboard including a writing sheet and a blackboard framework, the writing sheet constituting a writing surface of said blackboard, said blackboard horizontally extending and being foldable along the length thereof, the blackboard framework including a sheet retaining yoke, the sheet retaining yoke having two opposite arms in contact with a writing surface of the writing sheet which has been mounted on said blackboard framework;

a hinge enabling the blackboard to be folded along the length of said blackboard;

means for copying a writing, on the writing sheet, onto a recording medium; and means for supporting said blackboard in an upright position, said supporting means extending along the blackboard, the length of said supporting means being reducible in response to folded length reduction of said blackboard in a folded position.

* * * * *